(12) United States Patent
Sharma (10) Patent No.: US 12,170,621 B2
(45) Date of Patent: *Dec. 17, 2024

(54) DETERMINING QUALITY INFORMATION FOR A ROUTE

(71) Applicant: Comcast Cable Communications, LLC, Philadelphia, PA (US)

(72) Inventor: Alankar Sharma, Moorestown, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,900

(22) Filed: Jun. 6, 2023

(65) Prior Publication Data

US 2023/0318981 A1 Oct. 5, 2023

Related U.S. Application Data

(63) Continuation of application No. 17/462,915, filed on Aug. 31, 2021, now Pat. No. 11,711,306, which is a
(Continued)

(51) Int. Cl.
| | |
|---|---|
| *H04L 1/00* | (2006.01) |
| *H04L 43/065* | (2022.01) |
| *H04L 43/0817* | (2022.01) |
| *H04L 43/0876* | (2022.01) |
| *H04L 43/10* | (2022.01) |
| *H04L 45/12* | (2022.01) |
| *H04L 45/125* | (2022.01) |
| *H04L 45/302* | (2022.01) |

(Continued)

(52) U.S. Cl.
CPC ........ *H04L 47/2416* (2013.01); *H04L 43/065* (2013.01); *H04L 43/0817* (2013.01); *H04L 43/0876* (2013.01); *H04L 43/10* (2013.01); *H04L 45/124* (2013.01); *H04L 45/125* (2013.01); *H04L 45/306* (2013.01); *H04L 47/12* (2013.01)

(58) Field of Classification Search
CPC ..... H04L 43/065; H04L 43/10; H04L 45/124; H04L 45/306; H04L 47/12
See application file for complete search history.

(56) References Cited

U.S. PATENT DOCUMENTS

| | | | |
|---|---|---|---|
| 6,990,111 B2 | 1/2006 | Lemoff et al. | |
| 7,046,636 B1 * | 5/2006 | Shaffer | H04L 12/6418 370/252 |

(Continued)

FOREIGN PATENT DOCUMENTS

EP 1698101 B1 3/2008

*Primary Examiner* — Abdelnabi O Musa
(74) *Attorney, Agent, or Firm* — Banner & Witcoff, Ltd.

(57) ABSTRACT

Methods and systems for determining traffic information for devices along one or more routes are described. A content server may send a message to a plurality of devices along a route. The message may comprise an indication requesting each of the devices to send, to the content server, status information regarding the respective device. Intermediary devices may receive the message, respond with the requested information, and forward the message through the route. The message may comprise a stateless messaging protocol message such as an ICMP or UDP packet.

20 Claims, 6 Drawing Sheets

Related U.S. Application Data continuation of application No. 16/539,767, filed on Aug. 13, 2019, now Pat. No. 11,140,087, which is a continuation of application No. 14/931,027, filed on Nov. 3, 2015, now Pat. No. 10,432,540.

(51) Int. Cl.
 *H04L 47/2416* (2022.01)
 *H04L 47/12* (2022.01)

(56) References Cited

U.S. PATENT DOCUMENTS

| | | |
|---|---|---|
| 7,986,689 B2 | 7/2011 | Shen et al. |
| 7,991,864 B2 | 8/2011 | Patel et al. |
| 9,231,866 B2* | 1/2016 | Sundaram ............ H04L 49/3009 |
| 2005/0169254 A1 | 8/2005 | Kurita et al. |
| 2006/0083237 A1 | 4/2006 | Sakata et al. |
| 2006/0187842 A1 | 8/2006 | French |
| 2009/0080336 A1* | 3/2009 | Zhang ..................... H04L 43/00 370/248 |
| 2009/0086642 A1* | 4/2009 | Davis ...................... H04L 45/28 370/242 |
| 2009/0092124 A1* | 4/2009 | Singhal ................. H04L 67/104 370/252 |
| 2010/0208634 A1 | 8/2010 | Eng et al. |
| 2010/0220649 A1 | 9/2010 | Sakai |
| 2012/0030150 A1 | 2/2012 | McAuley et al. |
| 2012/0059578 A1 | 3/2012 | Venkatraman |
| 2013/0159509 A1* | 6/2013 | Poese ..................... H04L 67/101 709/224 |
| 2016/0006794 A1 | 1/2016 | Acosta Amador |
| 2016/0073289 A1* | 3/2016 | Lu ....................... H04W 28/0289 370/229 |
| 2017/0353402 A1 | 12/2017 | Kenney et al. |
| 2019/0027111 A1* | 1/2019 | Wilde ..................... H04W 4/21 |

* cited by examiner

| Source Port = XX | Destination Port = 33655 |
|---|---|
| Packet Length (16 bits) | Checksum (16 bits) |
| Data = [code] ||

FIG. 6a

| Source Port = 33655 | Destination Port = XX |
|---|---|
| Packet Length (16 bits) | Checksum (16 bits) |
| Data = [code] [total port bandwidth] [currently available bandwidth] [load interval] [input errors] [output errors] ||

FIG. 6b

DETERMINING QUALITY INFORMATION FOR A ROUTE

CROSS-REFERENCE TO RELATED APPLICATIONS

This application is a continuation of and claims priority to U.S. patent application Ser. No. 17/462,915, filed Aug. 31, 2021, which is a continuation of U.S. patent application Ser. No. 16/539,767, filed Aug. 13, 2019 (now U.S. Pat. No. 11,140,087), which is a continuation of U.S. patent application Ser. No. 14/931,027, filed Nov. 3, 2015 (now U.S. Pat. No. 10,432,540), which are incorporated herein by reference in their entireties.

BACKGROUND

Internet networks are becoming increasingly complicated in order to handle increasing demands from users. As users continue to consume data at an ever-increasing rate, existing networks must expand and adapt in order to provide requested services. This demands reliable methods for determining information about the network. However, some methods of determining network information create notable overhead through the use of stateful packets and/or re-allocating routes that are already sending content using old data. There is an ever-present need for more reliable and accurate ways to determine real-time network information with a minimal impact on the network.

SUMMARY

Various features described herein may provide information regarding a route in a network and may further provide techniques for determining bottlenecks in a network that a system may use to determine how to distribute content. The system may allocate content to a route based on real-time information, avoiding congestion and increasing the efficient utilization of links. The routing devices along the route may supply status information corresponding to their network connections, allowing the system to determine a best route prior to sending content (which may prevent the system from sending content on an already congested network). For example, a computing device may select a route from among multiple possible routes based on routing devices providing information which allows the system to determine the route with the least traffic or bottlenecks.

According to some aspects, a sending device may transmit packets through a route to determine the status of devices along the route. The packet may be a stateless messaging packet, such as an Internet Control Message Protocol (ICMP) packet. Each device on the route may send a response back in response to the packet, and/or forward the packet on to the next device in the route. The sending device may then determine information about the route, such as bandwidth limitations at one device, transmission errors at the device, and/or data type limitations at another device. In some instances, this process may be repeated across multiple routes, and the best route may be determined from among the multiple available routes based on the responses.

These features in the summary above are merely illustrative of the features described in greater detail below, and they are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
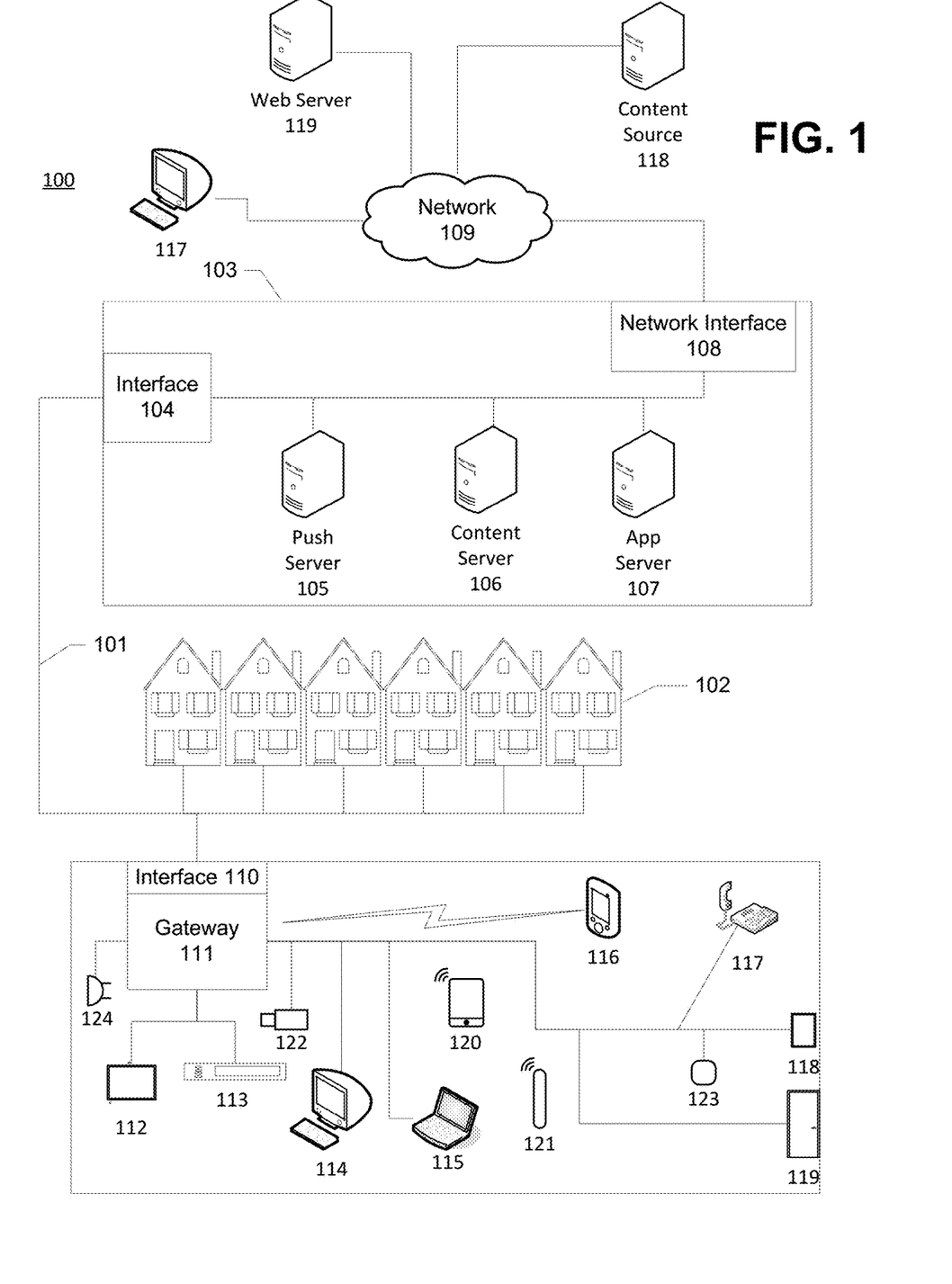
FIG. 1 illustrates an example information access and distribution network in accordance with one or more aspects as described herein.

FIG. 1 illustrates an example information distribution network 100 in which many of the various features described herein may be implemented. The information distribution network 100 may be any type of information distribution network, such as satellite, telephone, cellular, wireless, etc. One example may be a wireless network, an optical fiber network, a coaxial cable network, or a hybrid fiber/coax (HFC) distribution network. Such networks use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networking devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network, its corresponding cell phones, web server 119, and/or content source 118.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in homes. This content may be, for example, video on demand, television programs, songs, services, information, text listings, etc. The content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway 111 may be a set-top box (STB), digital video recorder (DVR), computer server, and/or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and/or others.

As used herein, when one computing device instructs a different computing device to perform one or more operations, the computing device may send one or more instructions with one or more parameters for the operations to the different computing device, which may execute the one or more instructions with the one or more parameters to perform the instructed operations.

Figure 2:
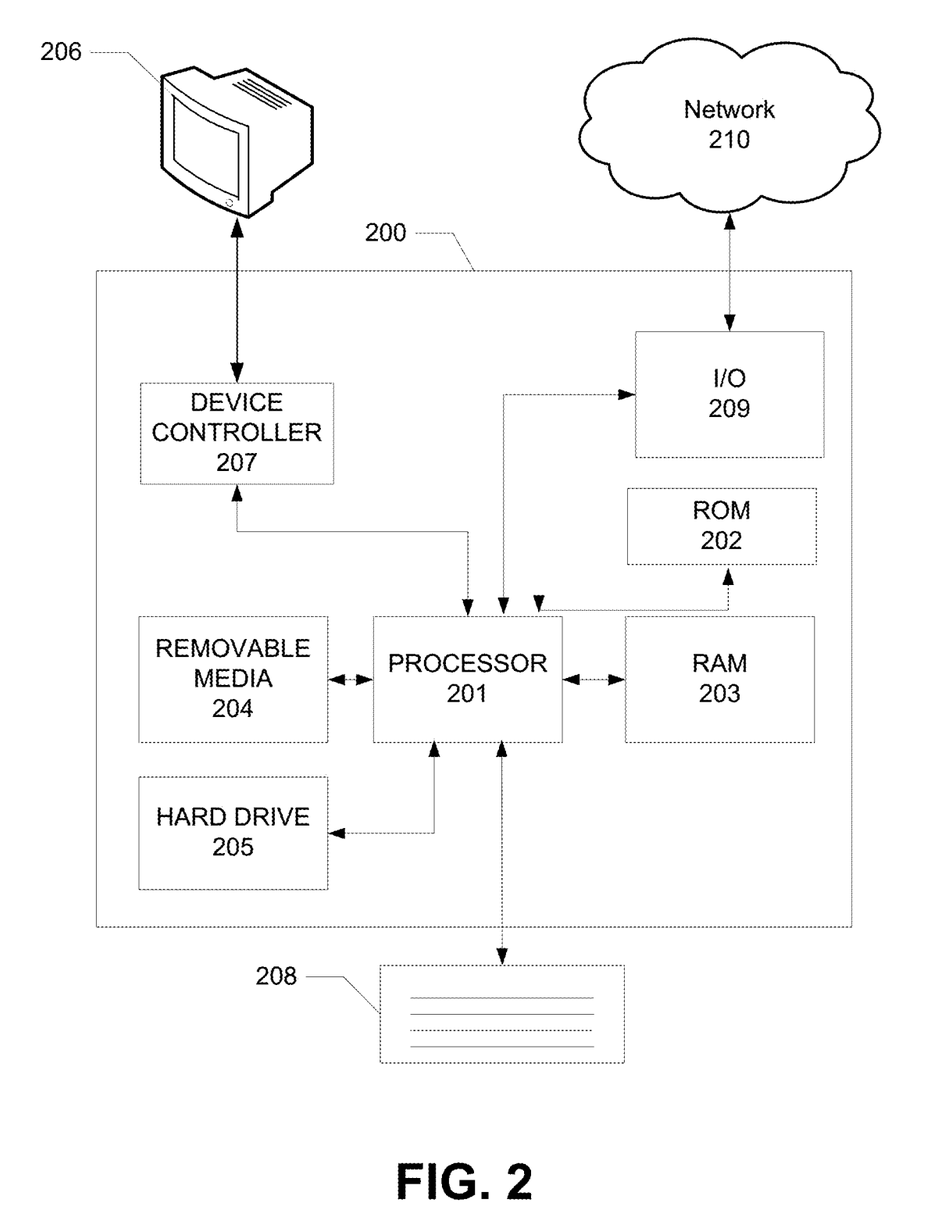
FIG. 2 illustrates an example computing device that may be used to implement any of the features and devices described herein.

FIG. 2 illustrates general hardware elements of an example computing device 200 that can be used to implement any of the elements discussed herein and/or illustrated in the figures. The computing device 200 may include one or more processors 201, which may execute instructions of a computer program to perform any of the features described herein. The instructions to configure the operation of the processor 201 may be stored in any type of computer-readable medium or memory. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, and/or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces such as an interface 209 (such as a network card), to communicate with a network 210. The network interface may be a wired interface, wireless interface, or a combination of the two. The interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), and/or any other desired network.

The FIG. 2 example is an example hardware configuration. Modifications may be made to add, remove, combine, divide, or otherwise alter the components as desired. Additionally, the components illustrated may be implemented using basic computing devices and components, and the same components (e.g., processor 201, ROM 202, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, and executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
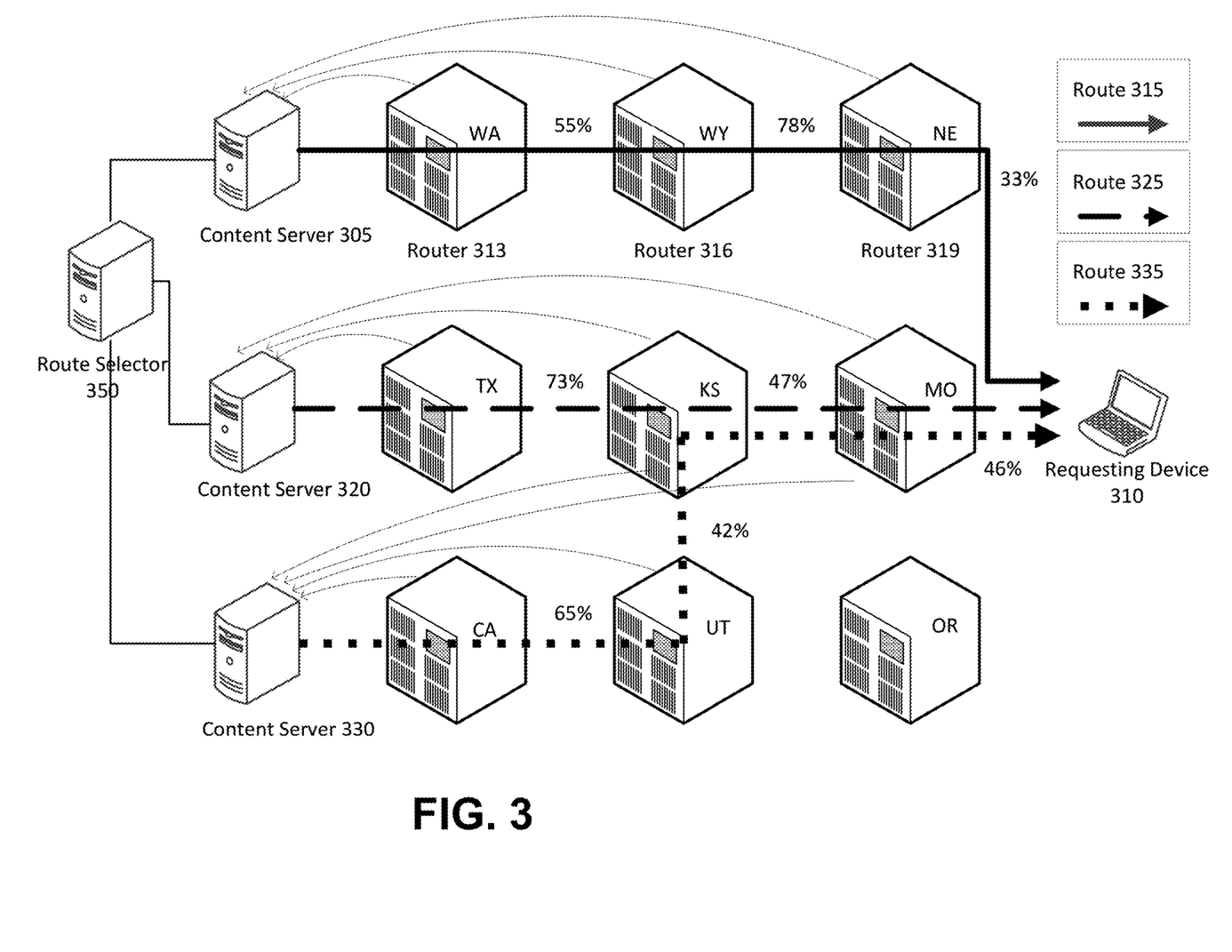
FIG. 3 illustrates an example system for determining route information in accordance with one or more aspects as described herein.

FIG. 3 illustrates an example system for determining route information in accordance with one or more aspects as described herein. A content server 305 may be a content server 106 of the type shown in FIG. 1 configured to transmit content to a requesting device 310. The requesting device 310 may be implemented as a computing device 200 of the type shown in FIG. 2. A route 315 may exist between the requesting device 310 and the content server 305 for delivery of content. As an example geographical arrangement, the route may comprise a router 313 located in Washington, a router 316 located in Wyoming, and a router 319 located in Nebraska. After the requesting device 310 requests content, the content server may then send a message through the route. The message may comprise a stateless messaging protocol packet, such as an ICMP packet or a user datagram protocol (UDP) packet. This may have the advantage of reducing overhead (e.g., a stateless messaging protocol packet may be small and/or not require acknowledgment) while obtaining near real-time information about downstream devices.

The message may comprise requested information specific to devices (e.g., routers) on the route. A packet header may include a code indicating information to be provided from the device. In some embodiments a code may represent a requested parameter or combination of parameters. Further discussion of messages and codes may be found in FIGS. 5a, 5b, 6a, and 6b below.

A first router 313 may receive the message. The first router 313 may then use information in the message to determine what information has been requested. For example, the first router 313 may use software or hardware to determine a code in a packet header of a stateless messaging protocol packet. The first router 313 may then send a reply packet back to the content server 305. For example, the reply packet may be a packet indicating the utilization of a downstream link from the first router 313 to a second router 316 (e.g., represented as a percentage, such as 55%). The first router 313 may also forward the message on to the second router 316. The second router 316 may then examine the message to determine requested information. The second router may send a reply packet back to content server 305. The reply packet may indicate the utilization of a downstream link from the second router 316 to the third router 319 (e.g., represented as a percentage, such as 78%). The third router may also forward the message to a third router 319. The third router 319 may then examine the message and determine requested information. The third router may send a reply packet back to content server 305. The reply packet may indicate the utilization of a downstream link from the third router 319 to the requesting device 310. (e.g., represented as a percentage, such as 33%). The third router 319 may also forward the message to the requesting device 310. In some instances, the requesting device 310 may send a message back to the content server 305. For example, the message may indicate that the requesting device 310 has been reached.

The content server 305 may make a decision based on the quality of the route 315. In some instances, the content server 305 may decide not to serve the content because congestion exceeds some threshold. For example, the content server 305 may determine that the route is too congested to serve the requested content because one of the downstream links has 78% utilization. In some other instances, the content server 305 may decide to serve the content in an alternative form because congestion exceeds or is within another threshold. For example, the content server 305 may determine that content sent over a downstream link with between 55% and 75% utilization should be sent with reduced quality or delayed. This may have the advantage of reducing the impact that may result if the content server 305 serves content in its original form when there is insufficient bandwidth, which may cause problems such as improper playback of content or congestion on the network. In some embodiments, if requesting device 310 receives a failure message or a time-out, it may request the content from an alternate source, such as content server 320.

In some embodiments, a route selector 350 may determine information about multiple routes. For example, the route selector 350 may determine a best route for a given content request from a requesting device 310. The route selector 350 may then perform one or more methods described herein across multiple routes. For instance, the route selector may instruct a content server 305 to send a message through route 315, a content server 320 to send a message through route 325, and a content server 330 to send a message through route 335. The messages may request status information for devices along each route at the time the content request is may so that responses may provide real-time or near real-time information for the route. The route selector 350 may then select a route based on the information obtained by each content server on each route. For example, the route selector 350 may instruct the content server 330 to send the content across route 335 because the highest utilization of a downstream link along route 335 is 65%, which is lower than the highest utilization among other routes. If no route is suitable, the route selector 350 may instruct a content server to reduce the quality of the content, delay sending the content, or may not instruct any content server to serve the content.

Figure 4:
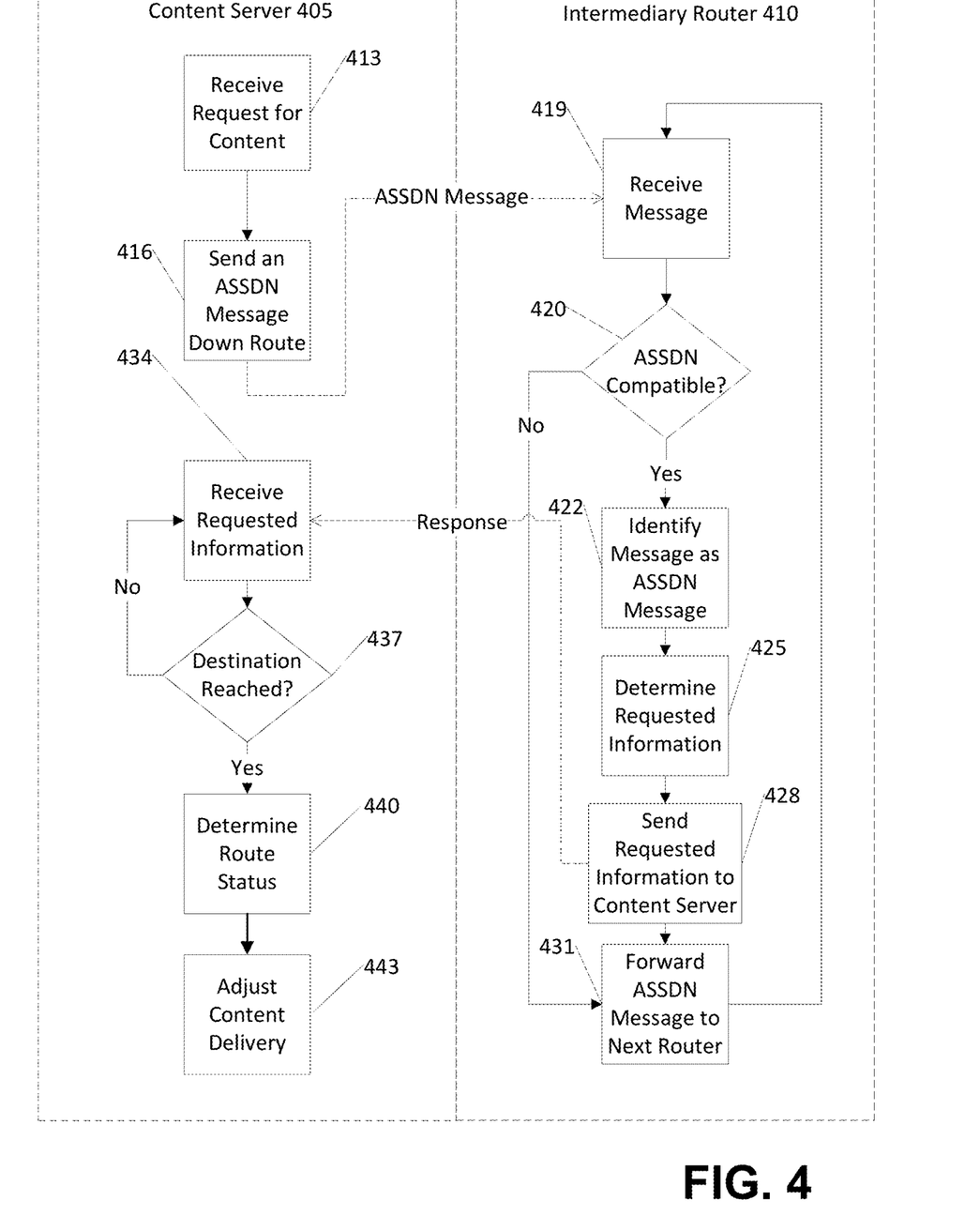
FIG. 4 illustrates an example method for determining route information in accordance with one or more aspects as described herein.

FIG. 4 illustrates an example method for determining route information in accordance with one or more aspects as described herein. A content server 405 may receive a request for content 413 from a requesting device. For example, a content server 405 may be the content server 305 and receive a content request from a requesting device 310 as depicted in FIG. 3. In response to the content request, the content server 405 may send a message downstream. For example, the message may comprise an Auto Send-path State Discovery in Network (ASSDN) message. The ASSDN message may comprise a stateless protocol messaging packet such as an ICMP and/or UDP packet.

At step 419, an intermediary router 410 (such as router 313 in FIG. 3) may receive the ASSDN message from the content server 405. At step 420, the intermediary router 410 may behave differently if the intermediary router 410 is programmed to recognize the request based on header information (e.g., ASSDN-compatible). If the intermediary router 410 is ASSDN-compatible, it may identify the message as an ASSDN message at step 422. If the intermediary router 410 is not ASSDN-compatible, it may fail to identify the message as an ASSDN message, and the method may proceed to step 431.

At step 422, the intermediary router 410 may identify the message as a request for information, such as an ASSDN message. The intermediary router 410 may determine the type of message based on header information. For example, the intermediary router 410 may examine header information of the ASSDN message and check for a code indicating that the received message is an ASSDN message.

After determining that the message is an ASSDN message, the intermediary router 410 may determine any requested information from the message at step 425. For example, the intermediary router 410 may examine header information for a code. The code may indicate requested information, as described above in FIG. 3. The intermediary router 410 may then compile and send the requested information in step 428.

At step 428, the intermediary router 410 may send a response to the content server 405 with the requested information. A header of the response may indicate what information is enclosed in the response. For example, the header may indicate which data fields are present. The response may also include data fields, which may comprise the requested information as determined in step 425. The response may also comprise an identifier of the intermediary router 410.

At step 431, the intermediary router 410 may forward the ASSDN message on to the next router on the route. In many instances, the intermediary router 410 may be configured to handle forwarding a message such as an ASSDN message in hardware and/or software. In some instances, the intermediary router 410 may be ASSDN-compatible and configured in hardware and/or software to respond to the request. In other instances, the intermediary router 410 may not be ASSDN-compatible, but the router may still know to forward the message on to another router. For example, most routers include hardware configured to forward ICMP packets along a route. If the intermediary router 410 were not ASSDN-compatible, the intermediary router 410 may still forward an ICMP packet comprising the ASSDN message using legacy functions. This may have the advantage of allowing a system including one or more devices that are not ASSDN-compatible to still operate using the methods described herein. In some embodiments, the forwarding may occur prior to or in parallel with identifying the message as an ASSDN message. For example, the intermediary router 410 may determine that the packet is to be forwarded and prepare the packet for forwarding in one piece of internal hardware (such as a specialized packet processor) while another piece of internal hardware (such as a general purpose processor) determines if the message is an ASSDN message.

At step 434, the content server 405 may receive the requested information. At step 437, the content server 405 may check to determine if the final destination of the ASSDN message (such as a requesting device 310) has been reached. For example, the content server 405 may examine the time to live (TTL) of received responses. Since the TTL should decrement for every hop, the content server 405 may determine which devices have responded based on the TTL. If a TTL indicates that the last hop in a route has responded, or if a number of responses and/or time surpass a threshold, the content server 405 may determine that the destination has been reached. In some instances, the requesting device may respond with a message that it has received the ASSDN packet, indicating that the destination has been reached. If it has not been reached, the content server 405 may return to receiving requested information at step 434. If the destination has been reached, the content server may proceed to determining a route bottleneck at step 440.

At step 440, the content server 405 may determine a status or quality of the route. For example, determining the status or quality of the route may comprise determining whether the route suffers from bottlenecks or congestion. The content server 405 may examine the requested information, such as bandwidth information, data types handled, maximum transmission unit (MTU) sizes, and/or other such information (such as the requested information described in FIG. 3), and determine the most limiting responses. For example, the content server 405 may determine the lowest bandwidth from any response, any data types not handled from any response, and/or the smallest MTU size from any response. The content server 405 may determine what bottlenecks exist in the route based on the limiting information. In some instances, the content server 405 may determine the bottlenecks in a route based on the most limiting responses without determining the source of the responses. For example, the content server 405 may determine the minimum bandwidth by determining the lowest bandwidth from any response, which may not require the intermediary router 410 to identify any responding device. In some instances, the content server 405 may determine a quality value for the route based on the limiting responses.

At step 443, the content server 405 may adjust content delivery based on the responses. For instance, the content server 405 may determine that only certain data types are supported by a route and that the route has a limited bandwidth. In some instances, the content server 405 may select a data type for the content based on the supported data types and select a bit-rate for the content to accommodate the limited bandwidth. In other instances, the content server may determine to delay or cancel sending the content due to route limitations. In yet other instances, the content server may redirect the content request to another content server (such as content server 320) to handle the content request or may instruct route selector 350 to select a different route.

Figure 5A:
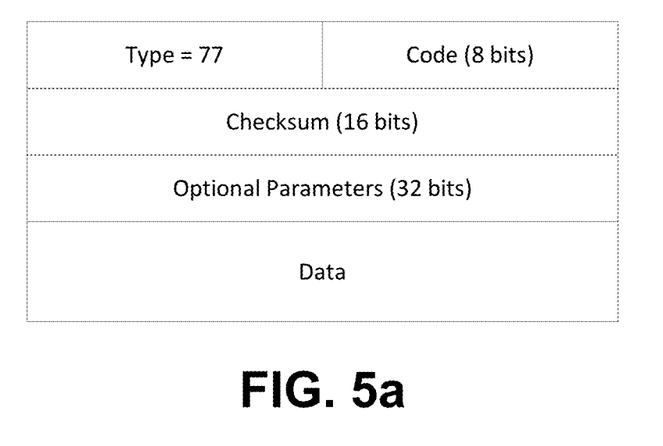
FIG. 5a illustrates an example ICMP requesting packet for determining route information in accordance with one or more aspects as described herein.

FIG. 5a illustrates an example ICMP requesting packet for determining route information in accordance with one or more aspects as described herein. A type may be used to identify the packet as an ASSDN packet. A previously unused header value (for example, type values 42 to 250 may not be in use) may be utilized for indicating an ASSDN packet. For example, a type value of 77 may identify the packet as an ASSDN packet. A "code" field may indicate requested information for downstream devices. For example, the message may comprise codes for requested information such as:

TABLE 1

| Code | Value |
|---|---|
| 00 | Total Port Bandwidth |
| 01 | Currently Available Path Bandwidth |
| 02 | Load Interval |
| 03 | Input Errors |
| 04 | Output Errors |
| 05 | Interface up/down transitions |
| 06 | dB level for optics |
| 07 | Drops or discards on the outgoing port |
| 08 | Access Control List (ACL) |
| 09 | Service Policy |
| 10 | MTU Supported |
| 11 | All of the Above |

Alternative types may indicate an alternative set of codes for an alternative hierarchy of information. For example, a code of 78 may indicate a requested level of information, which may include several values as described in Table 1. A code (e.g., "00") may supply basic information, a code (e.g., "01") may supply verbose information, and a code (e.g., "02") may supply very verbose information. Each level of information may correspond to one or more values above. For example, a code of "00" may supply total port bandwidth, currently available path bandwidth, and load interval. Each ascending code may include the previous code as a subset of requested information while including additional requesting information. For example, a code of "01" may supply the information from code 00, as well as input errors and output errors. In this manner, different codes corresponding to different types may present a wide range of possible requested information for a message.

In some embodiments, a type normally associated with another kind of message may be used along with code values that are not utilized by the other kind of message. If a normally unused code value is present, this may indicate that the message is an ASSDN message. For example, a type value of 8 may normally indicate a ping message. Handling this message may be implemented in legacy devices. If an ASSDN-compatible device notices a code value of 1 (rather than an expected code value of 0 for a type value 8 message) it may determine that the message is an ASSDN message instead of a ping message, and respond according to the code value. This may have the advantage of utilizing a type value that legacy devices may already be configured to handle to indicate requested information for ASSDN-compatible devices, allowing the systems to operate with minimal configuration and/or disruption.

Optional parameters may indicate which request the information is to be responsive to if multiple requests have been sent. The packet may further include a data field that includes the requested information and/or a checksum.

Figure 5B:
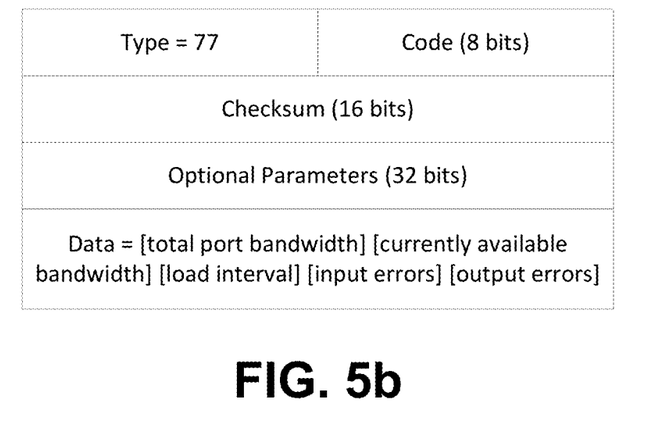
FIG. 5b illustrates an example ICMP response packet for determining route information in accordance with one or more aspects as described herein.

FIG. 5b illustrates an example ICMP response packet for determining route information in accordance with one or more aspects as described herein. A type may be used that matches the type code used in the requesting packet. A code may be used that matches the code used in the requesting packet. In some instances, the response may not include all of the requested information, and the code may indicate only the information contained in the response. Optional parameters may indicate which request the information is responsive to if multiple requests from a server have been received. The packet may further include a data field including the requested information and/or a checksum.

Instead of or in addition to using ICMP packets to request status information, UDP packets or other types of packets may be used.

Figure 6A:
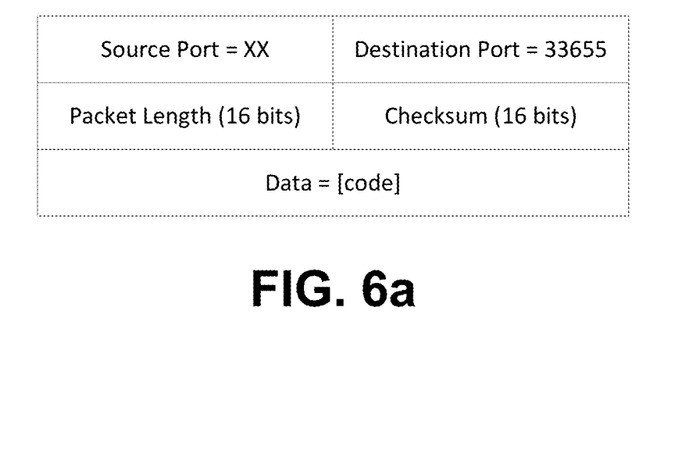
FIG. 6a illustrates an example UDP requesting packet for determining route information in accordance with one or more aspects as described herein.

FIG. 6a illustrates an example requesting packet for determining route information in accordance with one or more aspects as described herein. In some instances, the requesting packet may be a UDP packet. A destination port number may indicate that the packet is an ASSDN requesting packet. For example, a destination port of 33655 may identify the packet as an ASSDN requesting packet. A code, such as described above regarding FIG. 5a, may be included in the data field and identify any requested information for response. The packet may further include a packet length and/or checksum.

Figure 6B:
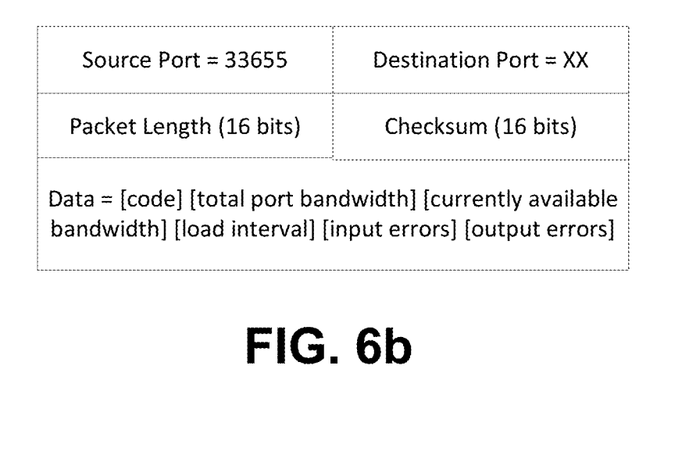
FIG. 6b illustrates an example UDP response packet for determining route information in accordance with one or more aspects as described herein.

FIG. 6b illustrates an example response packet for determining route information in accordance with one or more aspects as described herein. In some instances, the response packet may be a UDP packet. A source port number may indicate that the packet is an ASSDN response packet. For example, a destination port of 33655 may identify the packet as an ASSDN response packet. A code, such as described above regarding FIG. 5a, may be included in the data field and identify any requested information for response. The data field may further include the requested information. The packet may further include a packet length and/or checksum.

In some embodiments, an unassigned port may be used to determine the end of a transmission. A client device may not be configured to handle ASSDN messages. However, the client devices may trigger a response when a port is unreachable or disabled. An intermediary router may pass a message agnostic of the port value. By indicating an unassigned port as a destination, the client device may trigger a message indicating that the port is unreachable when the ASSDN message reaches the client device. The indication that the port is unreachable may be returned to the content server, which may indicate to the content server that the ASSDN message has reached its destination.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples and may be rearranged, combined, subdivided, omitted, and/or altered in any desired manner. For example, features of the servers may be subdivided among multiple processors and/or computing devices. The true scope of this patent should only be defined by the claims that follow.

The invention claimed is:

1. A method comprising:
   receiving, by a first routing device and based on a request for content from a requesting device, a packet to a plurality of routing devices comprising the first routing device, wherein the packet comprises an indication to each of the plurality of routing devices to send router status information;
   sending, by the first routing device and based on the indication, first information indicating a first status of the first routing device, wherein the first status is determined by the first routing device; and
   forwarding, by the first routing device, the packet to a second routing device.

2. The method of claim 1, further comprising:
   receiving the first information indicating the first status determined by the first routing device and second information indicating a second status determined by the second routing device;
   determining, based on the first information and the second information, a quality of a route comprising a subset of the plurality of routing devices; and
   causing, based on the quality, the content to be sent along the route.

3. The method of claim 1, further comprising
   receiving the first information indicating the first status determined by the first routing device and second information indicating a second status determined by the second routing device; and
   causing, based on the first information and the second information, the content to be sent along a route comprising a subset of the plurality of routing devices.

4. The method of claim 2, wherein the first information comprises bandwidth information, and wherein the determining the quality of the route comprises:
   determining, based on a determined lowest bandwidth, a minimum quality value; and
   determining, based on the minimum quality value, the quality of the route.

5. The method of claim 4, wherein the bandwidth information comprises a total port bandwidth of the first routing device.

6. The method of claim 1, wherein the first information indicates one or more of:
   a utilization of the first routing device,
   a priority setting of the first routing device, or
   a data type handled by the first routing device.

7. The method of claim 1, wherein the packet comprises a stateless messaging protocol packet comprising a header, and wherein the header comprises the indication.

8. The method of claim 1, wherein the packet comprises an Internet Control Message Protocol (ICMP) packet comprising an Auto Send-path State Discovery in Network (ASSDN) type value.

9. The method of claim 8, wherein the ASSDN type value comprises an unused header value of an ICMP standard.

10. A system comprising:
    a first computing device; and
    a second computing device;
    wherein the first computing device comprises:
       one or more first processors; and
       first memory storing first instructions that, when executed by the one or more first processors, cause the first computing device to:
          receive a packet sent, based on a request for content, to a plurality of routing devices comprising the first computing device and the second computing device, wherein the packet comprises an indication to each of the plurality of routing devices to send router status information;
          determine, based on the indication, first status information for the first computing device;
          send information indicating the first status information for the first computing device; and
          forward, to the second computing device, the packet; and
    wherein the second computing device comprises:
       one or more second processors; and
       second memory storing second instructions that, when executed by the one or more second processors, cause the second computing device to:
          receive the forwarded packet;
          determine, based on the packet, second status information for the second computing device; and
          send information indicating the second status information for the second computing device.

11. The system of claim 10, wherein the first status information comprises bandwidth information.

12. The system of claim 11, wherein the bandwidth information comprises a total port bandwidth of the first computing device.

13. The system of claim 10, wherein the first status information indicates one or more of:
    a utilization of the first computing device,
    a priority setting of the first computing device, or
    a data type handled by the first computing device.

14. The system of claim 10, wherein the packet comprises a stateless messaging protocol packet comprising a header, and wherein the header comprises the indication.

15. The system of claim 10, wherein the packet comprises an Internet Control Message Protocol (ICMP) packet comprising an Auto Send-path State Discovery in Network (ASSDN) type value.

16. The system of claim 15, wherein the ASSDN type value comprises an unused header value of an ICMP standard.

17. A method comprising:
    receiving, by a first routing device of a plurality of routing devices, a packet comprising an indication to each of the plurality of routing devices to send router status information;
    determining, by the first routing device and based on the indication, a first status for the first routing device;

sending, by the first routing device, first information indicating the first status;

forwarding, by the first routing device and based on the packet, the packet to a second routing device of the plurality of routing devices;

receiving, by the second routing device, the packet;

determining, by the second routing device, a second status for the second routing device; and sending, by the second routing device, second information indicating the second status determined by the second routing device.

18. The method of claim 17, further comprising:

determining, based on the first information and the second information, a quality of a route; and causing, based on the quality of the route, content to be sent via the route.

19. The method of claim 17, wherein the first information indicates one or more of:

a utilization of the first routing device, a priority setting of the first routing device, or a data type handled by the first routing device.

20. The method of claim 17, wherein the packet comprises a stateless messaging protocol packet comprising a header, and wherein the header comprises the indication.

* * * * *